Figure 1:
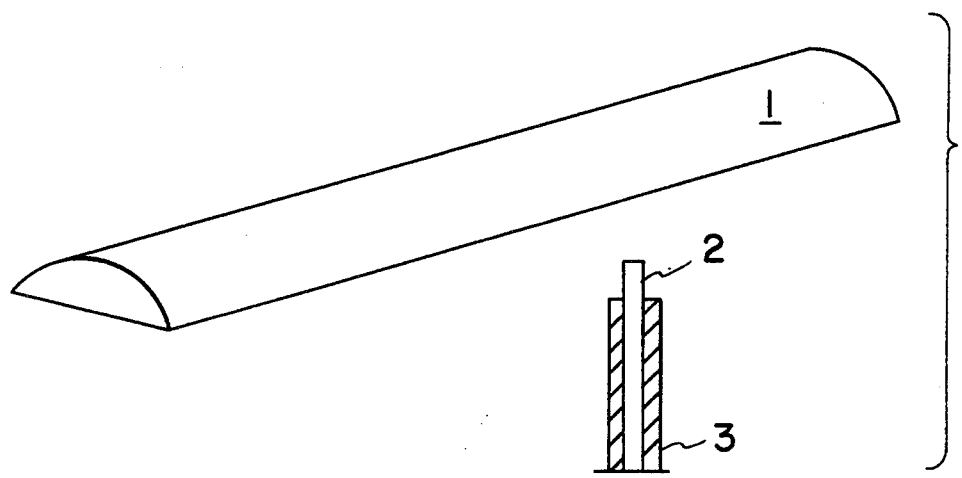

United States Patent [19]

Rebhan et al.

[11] Patent Number: 5,347,532
[45] Date of Patent: Sep. 13, 1994

[54] LASER HAVING AT LEAST ONE ANODE AND ONE CATHODE FOR PREIONIZATION AND/OR DISCHARGE

[75] Inventors: Ulrich Rebhan; Frank Voss, both of Göttingen, Fed. Rep. of Germany

[73] Assignee: Lambda Physik Gesellschaft Zur Herstellung Von Lasern mbH, Gottingen, Fed. Rep. of Germany

[21] Appl. No.: 985,320

[22] Filed: Dec. 4, 1992

[30] Foreign Application Priority Data

Oct. 6, 1992 [DE] Fed. Rep. of Germany ....... 4233634

[51] Int. Cl.5 .............................................. H01S 3/097
[52] U.S. Cl. ........................................................ 372/87
[58] Field of Search ............................ 372/83, 86, 87

[56] References Cited

U.S. PATENT DOCUMENTS

| | | | |
|---|---|---|---|
| 4,956,848 | 9/1990 | Terai et al. | 372/87 |
| 4,980,894 | 12/1990 | Steinfuhrer | 372/87 |
| 5,187,716 | 2/1993 | Haruta et al. | 372/87 |

Primary Examiner—Rodney B. Bovernick
Assistant Examiner—Robert E. Wise
Attorney, Agent, or Firm—Michael N. Meller

[57] ABSTRACT

Laser comprising at least one anode (1) and one cathode (2) for preionization and main discharge, the anode (1) and the cathode (2) having different standard potentials. The laser is distinguished by high reliability and long life. After several hours of operation, practically no material erosion at all is found at the electrodes.

7 Claims, 1 Drawing Sheet

LASER HAVING AT LEAST ONE ANODE AND ONE CATHODE FOR PREIONIZATION AND/OR DISCHARGE

The invention relates to a laser having at least one anode and one cathode for preionization and/or discharge. Furthermore, the invention relates to the use of specific metallic materials in anodes and cathodes in the preionization and/or discharge in a laser. In particular, the invention relates to a pulsed gas laser having at least one anode and one cathode.

The lasers known in the prior art frequently have at least one anode and cathode for preionizing the gas contained in the laser tube. Corresponding lasers have at least two further electrodes serving for the main or plasma discharge. The so-called pulsed gas lasers will be mentioned here as a typical example of a corresponding laser arrangement.

Pulsed gas lasers are known in a great variety of configurations, in particular as $CO_2$ lasers, excimer lasers or $N_2$ laser, etc. In pulsed gas lasers a so-called transverse stimulation of the laser gas in the form of a gas discharge (also referred to as main or plasma discharge) is widely employed.

It is also known to subject the laser gas prior to the main discharge to a so-called preionization in which before the actual main discharge as homogeneous as possible a distribution of free electrons (about $10^7$ electrons/cm$^3$) in the discharge space is produced. Such a preionization of the gas serves in particular to avoid the main discharge taking place as arc discharge. After the preionization the so-called main discharge then starts between the main electrodes of the laser and in this discharge the electron concentration in the so-called avalanche phase is multiplied by several orders of magnitude, for example to $10^{-14}$ to $10^{-15}$ electrons/cm$^3$.

For preionization in the prior art, as a rule external energy sources are employed, i.e. sources separate from the actual main discharge, for example UV light. This UV light is emitted for example by spark gads or corona discharges.

In particular in UV preionization in excimer lasers, spark gaps are used to generate UV light in order to form in the actual gas volume intended for the discharge enough free charge carriers by photoionization or photoeffect at the electrode surfaces. These charge carriers then multiply in avalanche manner through large volumes in the ignition of the main discharge between the main electrodes (anode and cathode).

In the prior art the electrodes are always made from the same metallic material. It has now been found that the sparks of the preionization lead to a material erosion and/or a material alteration of the metallic preionization electrodes according to the prior art, between which the spark "burns". The material alteration or material erosion also depends to a particular extent on the fluorine ($F_2$) or hydrogen chloride (HCl) content of the excimer laser gas mixture. Within the sparks and at the base points (surfaces of the electrodes) the metal of the anode or cathode reacts with $F_2$ or F derivatives such as F*, F−, F radicals, etc., or with HCl or the cleavage products thereof.

The material erosion or the material alterations all impair the preionization, i.e. the UV generation for preionization purposes, and in time this leads to serious disturbance of the main discharge. As a result of this, at the main electrodes a local decrease of the electron concentration occurs and the discharge homogeneity of the main discharge is therefore disturbed.

The material alterations due for example to formation of metal fluorides or chlorides influence the break down properties of the preionization electrodes by considerably impairing them and thus drastically reducing the UV generation for preionization purposes.

The material alterations or material erosion observed on the metallic preionization electrodes according to the prior art have also been observed on the main electrodes of excimer lasers.

It is clear that the phenomena observed are disadvantageous both to the reliability and to the length of the life of pulsed gas lasers, in particular excimer discharge units.

The invention is based on the problem of providing a laser having at least one anode and one cathode for preionization and/or discharge which has a longer life and thus greater reliability than the known lasers.

This problem is solved in that the anode and the cathode have metallic materials of different standard potentials.

The subject of the invention is thus a laser having at east one anode and cathode for preionization, the anode and cathode comprising metallic materials of different standard potentials.

A further subject of the invention is a laser having at least one anode and cathode for the main discharge, the anode and cathode comprising metallic materials of different standard potentials.

According to a more specific embodiment of the invention the difference of the standard potentials between anode and cathode is at least 0.3 volt, preferably 0.6 volt. In a further development of the invention the electrode of the metallic material with the lower standard potential comprises substantially copper. The electrode of the metallic material with the higher standard potential preferably comprises substantially platinum.

In a preferred embodiment of the invention the material of the cathode has a higher standard potential than the material of the anode. Preferably, the cathode consists substantially of platinum and the anode substantially of copper.

The invention is preferably employed in pulsed gas high-pressure lasers.

The subject of the invention is also the use of anodes and cathodes of metallic materials for preionization and/or discharge in a laser, a difference in the standard potentials being present between the metallic materials which form the anode and cathode respectively.

It has now been found that in lasers equipped with electrodes according to the invention the reliability and long life can be appreciably improved, in particular in the case of excimer discharge units. This manifests itself inter alia in that the lasers according to the invention after several hundred operating hours exhibit practically no material erosion or material alterations at the electrodes. This advantage was found to be particularly great when a material of higher standard potential was chosen for the cathode than for the anode, in particular when the cathode was made substantially from platinum and the anode substantially from copper.

The advantages according to the invention occur both in the preionization and in the discharge electrodes.

An example of embodiment of the invention will be explained in detail hereinafter with the aid of the drawings, wherein:

FIG. 1 shows schematically a laser preionization means and

Figure 2:
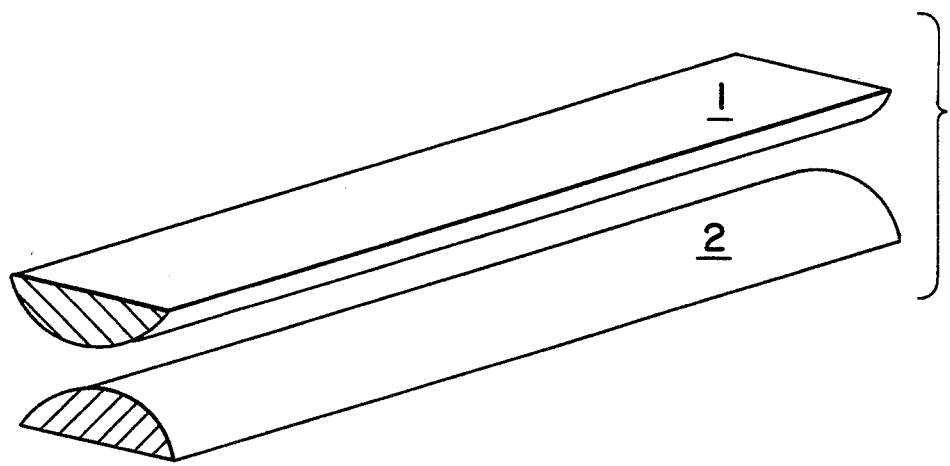

FIG. 2 a main discharge unit of an excimer laser.

In FIG. 1 a preionization unit is shown schematically and comprises an anode 1 and a cathode 2. The cathode 2 formed as pin is surrounded by an insulation 3. The laser tube in which this electrode arrangement is located is not illustrated and nor is the energy supply and control, known per se.

FIG. 2 again shows schematically a laser having a cathode 2 and an anode 1 in a laser tube (not illustrated) as main discharge arrangement.

EXAMPLE

The following procedure was adopted to simulate a typical preionization situation in operation of a gas high-pressure laser.

A laser tube (40 cm long, diameter 20 cm) having a copper rail ($10 \times 1 \times 0.5$ cm$^3$) as anode and a platinum pin (5 cm long, diameter 0.5 cm) as cathode was first evacuated and then filled with krypton, neon and fluorine. The distance between the electrodes was about 0.5 cm. The pressure in the tube was $3.10^{+5}$ Pa, corresponding to the pressure in operation of a typical excimer.

A voltage of 10 Kilovolts was applied to the electrodes.

For comparison, a tube as described above with electrodes of corresponding dimensions, although of copper only, was prepared. This tube was subjected to the same conditions as described above.

The electrodes of the tubes were subjected to a detailed analysis after about 500 hours.

In the case of the copper electrodes according to the prior art a pronounced material erosion was observed both at the anode and at the cathode. This material erosion was even apparent with the naked eye. In particular, the pin of copper was highly eroded. The copper anode was visibly effected by the discharge. A more exact investigation also showed that partially non-metallic structures had grown on the copper anode. In contrast, the electrodes according to the invention exhibited no material erosion whatever. Both the anode and the cathode exhibited no outwardly visible changes whatever. Furthermore, on a more exact investigation of the anode no non-metallic structures at all were found.

These results show that the choice of different electrode materials enables the erosion at the anode and cathode to be considerably reduced. This applies however not only to the conditions under which a preionization takes place but also to the subsequent main discharge in a laser tube.

Consequently, the invention contributes to lengthening the life of lasers having electrodes for the purpose of preionization and/or discharge.

We claim:

1. An excimer laser comprising at least one anode and one cathode for pre-ionization, wherein the surfaces of the anode and the cathode which are exposed to the pre-ionization spark are made of metallic materials of different standard potentials with said metallic cathode material having a higher standard potential than said metallic anode material.

2. An excimer laser according to claim 1, wherein the difference of the standard potentials between anode and cathode is at least 0.3 volt.

3. An excimer laser according to claim 1, wherein the difference of the standard potentials between anode and cathode is at least 0.6 volt.

4. An excimer laser according to claim 1, wherein the electrode of the metallic material with the lower standard potential consists substantially of copper.

5. An excimer laser according to claim 1, wherein the electrode of the metallic material with the higher standard potential consists substantially of platinum.

6. An excimer laser according to claim 1, wherein the cathode consists substantially of platinum and the anode substantially of copper.

7. An excimer laser comprising at least one anode and one cathode for a main discharge, wherein the surfaces of the anode and the cathode which are exposed to the main discharge are made of metallic material of different standard potentials with said metallic cathode material having a higher standard potential than said metallic anode material.

* * * * *